(12) United States Patent
Ismail et al.

(10) Patent No.: US 12,682,678 B1
(45) Date of Patent: Jul. 14, 2026

(54) METHOD FOR PERFORMING CROSS-HAND PALMPRINT RECOGNITION

(71) Applicant: JOUF UNIVERSITY, Sakaka (SA)

(72) Inventors: Mohamed Mohamed Ezzeldin Ismail, Sakaka (SA); Ayman Mohamed Mostafa Hassaneen, Sakaka (SA); Meshari D. Alanazi, Sakaka (SA); Majed Abdullah Alrowaily, Sakaka (SA); Bader Munif Aldughayfiq, Sakaka (SA); Hisham Khalaf Allahem, Sakaka (SA); Amjad Faleh Alsirhani, Sakaka (SA); Mohammed Abdulhamid Alnusayri, Sakaka (SA)

(73) Assignee: JOUF UNIVERSITY, Sakaka (SA)

( * ) Notice: Subject to any disclaimer, the term of this patent is extended or adjusted under 35 U.S.C. 154(b) by 0 days.

(21) Appl. No.: 19/550,849

(22) Filed: Feb. 26, 2026

(51) Int. Cl.
    *G06V 40/13*     (2022.01)
    *G06V 10/82*     (2022.01)
    *G06V 40/12*     (2022.01)

(52) U.S. Cl.
    CPC .......... *G06V 40/1365* (2022.01); *G06V 10/82* (2022.01); *G06V 40/1347* (2022.01)

(58) Field of Classification Search
    CPC . G06V 40/1365; G06V 40/1347; G06V 10/82
    USPC ........................................................ 382/124
    See application file for complete search history.

(56) References Cited

U.S. PATENT DOCUMENTS

| | | | |
|---|---|---|---|
| 12,265,599 B2 | 4/2025 | Zhinong et al. | |
| 2004/0264742 A1* | 12/2004 | Zhang | G06V 40/1347 |
| | | | 382/115 |
| 2022/0270396 A1* | 8/2022 | Zhang | G06V 40/1365 |
| 2024/0177527 A1* | 5/2024 | Jiao | G06V 40/1365 |
| 2024/0265735 A1 | 8/2024 | Yuan et al. | |
| 2025/0022170 A1 | 1/2025 | Wang et al. | |
| 2025/0022309 A1 | 1/2025 | Yang et al. | |
| 2025/0259424 A1* | 8/2025 | Shen | G06V 10/774 |
| 2026/0010602 A1* | 1/2026 | Wang | G06F 21/32 |

OTHER PUBLICATIONS

Du, Xuefeng, et al. "Low-shot palmprint recognition based on meta-siamese network." 2019 IEEE International Conference on Multimedia and Expo (ICME). IEEE, 2019.

(Continued)

*Primary Examiner* — Allen H Nguyen
(74) *Attorney, Agent, or Firm* — Nath, Goldberg & Meyer; Joshua B. Goldberg

(57) ABSTRACT

The method for performing cross-hand palmprint recognition uses a semi-Siamese neural network to compare a first hand (e.g., a right hand) anchor embedding, which is obtained through feature aggregation of first hand images, to a second hand (e.g., a left hand) query embedding. The semi-Siamese neural network's branches share a feature-extraction backbone and employ distinct final-layer weights to allow hand-specific calibration while maintaining a common embedding space. A hybrid similarity is computed, which includes both an element-wise absolute-difference (EAD) vector and a Euclidean-distance scalar. These are concatenated and input to a classifier to produce a match score or decision regarding authentication.

12 Claims, 1 Drawing Sheet

*10*

(56) References Cited

OTHER PUBLICATIONS

Ezz, Mohamed. "Left Meets Right: A Siamese Network Approach to Cross-Palmprint Biometric Recognition." Electronics 14.10 (May 2025): 2093.
Ezz, Mohamed, et al. "Improved Siamese Palmprint Authentication Using Pre-Trained VGG16-Palmprint and Element-Wise Absolute Difference." Computer Systems Science & Engineering 46.2 (2023).
Ling, Ling, "Palmprint identification using PCA algorithm and hierarchical neural network." International Conference on Intelligent Computing for Sustainable Energy and Environment. Berlin, Heidelberg: Springer Berlin Heidelberg, 2010. Abstract.
Zhong, Dexing, et al. "Palmprint recognition using siamese network." Chinese conference on biometric recognition. Cham: Springer International Publishing, 2018.

* cited by examiner

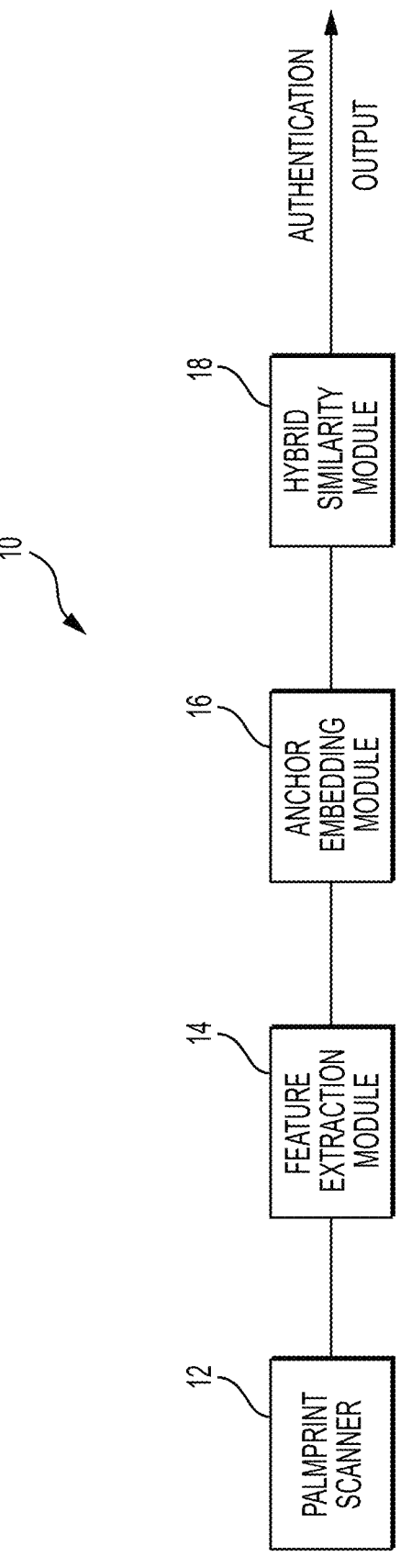

METHOD FOR PERFORMING CROSS-HAND PALMPRINT RECOGNITION

STATEMENT REGARDING PRIOR DISCLOSURES BY THE INVENTOR(S)

The presently claimed subject matter partially appeared in the following journal article: Ezz, Mohamed, "Left Meets Right: A Siamese Network Approach to Cross-Palmprint Biometric Recognition." Electronics 14.10 (2025): 2093. This journal article was published on May 21, 2025. The author's name, Mohamed Ezz, is an abbreviated version of the name of the present inventor Mohamed Mohamed Ezzeldin Ismail; i.e., Mohamed Ezz and inventor Mohamed Mohamed Ezzeldin Ismail are one and the same. Thus, the disclosure of the presently claimed subject matter was made by the inventor Mohamed Mohamed Ezzeldin Ismail less than one year prior to the filing of the present application. See the exception under 35 U.S.C. § 102(b)(1)(A).

BACKGROUND

Field

The disclosure of the present patent application relates to biometric authentication and identification, and particularly to a method for performing cross-hand palmprint recognition, allowing the use of stored images of an authorized user's first hand (e.g., a right hand) for authentication based on an image of the opposite second hand (e.g., the left hand).

Description of Related Art

Biometric recognition using palmprints has been widely adopted for access control and identity verification. Conventional authentication systems make use of same hand matching, i.e., only one hand is ever used for performing the authentication, thus requiring a large number of high-quality images of the same hand for enrollment. In operational settings where only one hand is available (e.g., due to user injury, capture constraints or forensic collection), such systems may be unable to complete a match.

Convolutional network approaches have improved palmprint feature extraction, however, Siamese architectures are commonly implemented with shared weights and trained for same hand verification. These designs learn a single embedding space optimized for comparing like-to-like palm images and generally do not address opposite hand (left↔right) matching, where systematic anatomical asymmetries complicate direct comparison. Template management in conventional systems often relies on a single enrollment sample per hand. However, single sample templates are susceptible to noise, pose, illumination and sensor variation, each of which can reduce robustness when the comparison involves a different hand or capture session. While some techniques average multiple images, such aggregation is typically used for the same hand and does not expressly enable cross-hand transfer.

Similarity evaluation is frequently performed with a single distance metric (e.g., Euclidean or cosine). A single metric may underutilize complementary cues, such as global displacement versus fine-grained, element-wise differences. This can limit discrimination, particularly when embeddings originate from different hands that share identity traits but differ in local structure. Training protocols likewise tend to construct positive pairs from same hand images, which does not explicitly enforce cross-hand proximity in the learned space. Without tailored sampling and loss design, models may not generalize to left-to-right or right-to-left comparisons at deployment. Existing palmprint systems are further limited by redundant computation pipelines when processing both hands independently. Thus, a method for performing cross-hand palmprint recognition solving the aforementioned problems is desired.

SUMMARY

The method for performing cross-hand palmprint recognition makes use of stored images of an authorized user's first hand (e.g., a right hand) and allows for authentication based on an image of the opposite second hand (e.g., the left hand). A plurality of palmprint images of the first hand of the authorized user are stored in non-transitory computer readable memory, and a palmprint image of the second hand of an unidentified user is obtained (through palmprint scanning or the like) and also stored in the non-transitory computer readable memory. Feature extraction is performed on each of the palmprint images of the first hand and the palmprint image of the second hand using a semi-Siamese neural network having a shared feature-extraction backbone and distinct final-layer weights for the plurality of palmprint images of the first hand and the palmprint image of the second hand.

A fixed length feature vector is extracted from each of the palmprint images of the first hand and the palmprint image of the second hand, and an anchor embedding is formed through feature aggregation by averaging the fixed length feature vectors extracted from a number of the palmprint images of the first hand to obtain a stable first hand anchor embedding. The number of palmprint images of the first hand used to form the anchor embedding may be between two and five of the palmprint images of the first hand. In an embodiment, the number of palmprint images of the first hand used to form the anchor embedding is four of the palmprint images of the first hand.

A hybrid similarity between the stable first hand anchor embedding and the one of the feature vectors corresponding to the palmprint image of the second hand is then computed. The hybrid similarity includes both an element-wise absolute-difference vector and a Euclidean-distance scalar. The element-wise absolute-difference vector and the Euclidean-distance scalar are concatenated to produce a combined similarity vector. The element-wise absolute-difference vector and the Euclidean-distance scalar may be normalized or scaled prior to the concatenation thereof.

The combined similarity vector is classified to output a match probability between the palmprint image of the second hand of the unidentified user corresponding to the stable first hand anchor embedding associated with the first hand of the authorized user. A determination can then be made that the unidentified user is the authorized user when the match probability is above a threshold probability.

Alternatively, the combined similarity vector may be classified to output a binary decision indicating whether the palmprint image of the second hand of the unidentified user corresponds to the stable first hand anchor embedding associated with the first hand of the authorized user. The determination of whether the unidentified user is the authorized user can then be based on the binary decision. The binary decision may be based on a decision threshold selected to satisfy a target false-acceptance rate and/or a false-rejection rate. Alternatively, the binary decision may be based on a decision threshold selected to minimize an equal error rate.

These and other features of the present subject matter will become readily apparent upon further review of the following specification.

BRIEF DESCRIPTION OF DRAWINGS

The sole drawing FIGURE illustrates system components for implementing the method for performing cross-hand palmprint recognition.

Similar reference characters denote corresponding features consistently throughout the attached drawings.

DETAILED DESCRIPTION

The method for performing cross-hand palmprint recognition makes use of stored images of an authorized user's first hand (e.g., a right hand) and allows for authentication based on an image of the opposite second hand (e.g., the left hand). A plurality of palmprint images of the first hand of the authorized user are stored in non-transitory computer readable memory, and a palmprint image of the second hand of an unidentified user is obtained (through palmprint scanning or the like) and also stored in the non-transitory computer readable memory. In the sole drawing FIGURE, the overall system architecture 10 is shown as including a palmprint scanner 12. It should be understood that any suitable type of palmprint scanner or other image capture device may be used. The palmprint scanner 12 may include its own controller, such as a processor or the like, with associated memory, or may be in communication with a separate controller for operating the palmprint scanner 12 and recording the images.

Feature extraction is performed on each of the palmprint images of the first hand and the palmprint image of the second hand using a semi-Siamese neural network having a shared feature-extraction backbone and distinct final-layer weights for the plurality of palmprint images of the first hand and the palmprint image of the second hand. Prior to feature extraction, the images may be preprocessed by palm region of interest (ROI) detection, alignment and normalization.

The feature-extraction backbone may be, as a non-limiting example, a visual geometry group (VGG) palmprint-tuned convolutional neural network (CNN), and the distinct weights may be confined to a final dense layer of each branch. It should be understood that feature extraction may be performed using any suitable type of method and/or system. In the sole drawing FIGURE, the feature extraction is shown taking place within a general feature extraction module 14. As non-limiting examples, feature extraction may be performed on a graphics processing unit (GPU), a neural processing unit (NPU), or using tensor processing unit (TPU) hardware acceleration. As discussed above, the semi-Siamese neural network's first hand and second hand branches share a feature-extraction backbone and employ distinct final-layer weights to allow hand-specific calibration while maintaining a common embedding space.

The feature extraction transforms the palmprint images into compact numerical representations suitable for matching. The images are processed by a palmprint-specialized convolutional neural network, such as the exemplary visual geometry group (VGG) palmprint-tuned convolutional neural network (CNN) noted above, to produce a feature embedding of constant dimensionality. As a non-limiting example, the embeddings may be 4096-dimensional vectors generated by the penultimate layer of the backbone. As further noted above, during feature extraction in the feature extraction module 14, preprocessing of the images may be performed (e.g., palm ROI detection/cropping, illumination normalization, resizing, etc.) prior to inference, and batching and/or hardware acceleration to meet latency targets. The feature embeddings are provided downstream to the pair-generation and comparison stages. Embedding may also be persisted in an enrollment store indexed by subject identifiers for later retrieval.

A fixed length feature vector is extracted from each of the palmprint images of the first hand and the palmprint image of the second hand, and an anchor embedding is formed through feature aggregation by averaging the fixed length feature vectors extracted from a number (N) of the palmprint images of the first hand to obtain a stable first hand anchor embedding. The number N of palmprint images of the first hand used to form the anchor embedding may be between two and five of the palmprint images of the first hand. In an embodiment, the number N of palmprint images of the first hand used to form the anchor embedding is four of the palmprint images of the first hand. The number N of samples may be selected adaptively based on sample quality metrics. In experiments, peak cross-hand performance using the AnchorEFA with N=4 resulted in a validation accuracy of approximately 86.26% and a receiver-operating characteristic curve (ROC)—area under the curve (AUC) of approximately 0.93, with a test-time ROC-AUC approximately equal to 0.89. The anchor embedding formed through feature aggregation (AnchorEFA) suppresses sample noise while preserving identity-stable traits. The anchor embedding is shown in the sole drawing FIGURE as taking place within a general anchor embedding module 16.

The semi-Siamese neural network compares a stored anchor embedding derived by the AnchorEFA with an opposite hand query embedding. The first branch processes the AnchorEFA input while the second branch processes a query embedding corresponding to either a positive palm (i.e., the same identity) or a negative palm (i.e., a different identity). In the semi-Siamese neural network, the branches share a feature-extraction backbone and layer structure but are differentially calibrated via distinct final dense-layer weights, enabling hand-specific adaptation while maintaining a common representation space.

The outputs of the two branches of the semi-Siamese neural network are provided to a hybrid similarity module 18 of the system 10. A hybrid similarity between the stable first hand anchor embedding and the one of the feature vectors corresponding to the palmprint image of the second hand is then computed. The hybrid similarity includes both an element-wise absolute-difference (EAD) vector and a Euclidean-distance scalar. The element-wise absolute-difference vector and the Euclidean-distance scalar are concatenated to produce a combined similarity vector. The element-wise absolute-difference vector and the Euclidean-distance scalar may be normalized or scaled prior to the concatenation thereof.

The combined similarity vector is classified to output a match probability between the palmprint image of the second hand of the unidentified user corresponding to the stable first hand anchor embedding associated with the first hand of the authorized user, representing an authentication output as shown in the sole FIGURE. A determination can then be made that the unidentified user is the authorized user when the match probability is above a threshold probability. The classification layer may be a dense layer with sigmoid activation, as a non-limiting example. The classification output may also include a calibrated score interpretable as a likelihood ratio for forensic auditing. Following a determination of an authorized user, the output may be used in any desired application requiring identification and authentication, such as by way of non-limiting example the unlocking of a door, access to secure information, access to secure services, etc.

Alternatively, the combined similarity vector may be classified to output a binary decision indicating whether the palmprint image of the second hand of the unidentified user corresponds to the stable first hand anchor embedding associated with the first hand of the authorized user. The determination of whether the unidentified user is the authorized user can then be based on the binary decision. The binary decision may be based on a decision threshold selected to satisfy a target false-acceptance rate and/or a false-rejection rate. Alternatively, the binary decision may be based on a decision threshold selected to minimize an equal error rate.

In experiments, the average inference latency was found to be about $1.5056 \times 10^{-4}$ seconds per left-right hand pair during feature extraction and similarity computation on modern GPU hardware. These outcomes indicate a measurable enhancement in recognition robustness and runtime efficiency for cross-hand palmprint matching compared with conventional same hand-only pipelines.

In use, as a non-limiting example, only a single first hand anchor embedding through feature aggregation (AnchorEFA) may be stored, per user, in an identification database. With one-hand enrollment and storage of only a single AnchorEFA per user, the per-user template count is reduced while retaining cross-hand verification capability. The AnchorEFA may be computed offline and cached for multiple online comparisons. Further, the AnchorEFA may be incrementally updated upon receiving additional first hand images by recomputing the average feature. In addition to the above, the AnchorEFAs and similarity vectors may be encrypted and anonymized prior to storage or transmission to a cloud service.

The system may support local model updates or retraining on device data without transmitting raw palmprint images to external servers. Further, inference latency may be bounded to enable real-time access control within a predetermined time limit. The system may log combined similarity vectors and classification decisions for forensic auditing and system monitoring The cross-hand palmprint recognition model is trained similarly, beginning with initializing the semi-Siamese network with first hand and second hand branches sharing a feature-extraction backbone and employing different final dense-layer weights. The feature vectors are extracted from the first hand and the second hand images, and the anchor embeddings are then computed through feature aggregation (AnchorEFAs) by averaging N≥2 first hand vectors per identity. Triplets (anchor, positive, negative) are then formed, where the anchor is a first hand AnchorEFA, the positive is an opposite hand embedding of the same identity, and the negative is an opposite hand embedding of a different identity. Finally, a margin-based triplet loss combined with a binary cross-entropy loss on hybrid similarity outputs is optimized.

The system constructs training and evaluation pairs in a cross-hand setting. For a given individual, embedding of multiple images from one hand are provided to the AnchorEFA module 16 of the system 10, which computes an arithmetic mean across N embeddings (Nis between two and five) to yield a stable anchor (either a right hand anchor or a left hand anchor). The choice of N trades off robustness and compute cost, although, as discussed above, values of N between 2 and 5 have been found to be effective.

Positive pairs are produced by combining an anchor from one hand with a single opposite hand feature of the same individual. Negative pairs are produced by combining the anchor with an opposite hand feature from a different individual. Pair generation is bidirectional; i.e., a left hand anchor may be paired with right hand features, and a right hand anchor may be paired with left hand features. The process can be repeated with different random subsets of an individual's images to generate multiple anchors and increase coverage of intra-class variation. Anchors may be computed offline and cached, and the pipeline can enforce subject-disjoint splits between training, validation, and test cohorts.

In training, a margin-based objective can be used, such as, by way of non-limiting example, $\mathcal{L}_{triplet}=\max \{0, d(A, Q^+)-d(A, Q^-)+m\}$, where m is the margin, which may be, for example, between 0.1 and 0.4. Training can also include a binary cross-entropy loss on the classifier fed by the combined similarity vector. Exemplary hyperparameters include an Adam optimizer (e.g., 1e-4 LR), mini-batches balanced across subjects and left↔right directions, early stopping on validation loss or ROC-AUC, and patience (e.g., 10-30 epochs). This training design explicitly enforces cross-hand proximity, ensuring the embedding space encodes anatomical asymmetries while preserving identity traits, a capability absent from conventional same-hand Siamese training strategies.

As an alternative, instead of the semi-Siamese neural network, a fully non-shared (asymmetric) Siamese network may be used to maximize hand-specific specialization. The hybrid similarity may include normalization or scaling of EAD and/or Euclidean components before concatenation. Adaptive N may be selected per user based on sample quality, and incremental anchor updates may re-compute the mean when new first hand samples are acquired. Backbones other than VGG (e.g., ResNet, MobileNet, EfficientNet, or transformer-based models) can be substituted, provided that they produce fixed-length embeddings compatible with the AnchorEFA module 16 and the semi-Siamese comparison neural network.

It is to be understood that the method for performing cross-hand palmprint recognition is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method for performing cross-hand palmprint recognition, comprising:

storing a plurality of palmprint images of a first hand of an authorized user in a non-transitory computer readable memory;

obtaining a palmprint image of a second hand of an unidentified user and storing the palmprint image of the second hand in the non-transitory computer readable memory;

performing feature extraction on each of the plurality of palmprint images of the first hand and the palmprint image of the second hand using a semi-Siamese neural network having a shared feature-extraction backbone and distinct final-layer weights for the plurality of palmprint images of the first hand and the palmprint image of the second hand;

extracting a fixed length feature vector from each of the plurality of palmprint images of the first hand and the palmprint image of the second hand;

forming an anchor embedding through feature aggregation by averaging the fixed length feature vectors extracted from a number of the plurality of palmprint images of the first hand to obtain a stable first hand anchor embedding;

computing a hybrid similarity between the stable first hand anchor embedding and the one of the feature vectors corresponding to the palmprint image of the second hand, wherein the hybrid similarity comprises an element-wise absolute-difference vector and a Euclidean-distance scalar;

concatenating the element-wise absolute-difference vector and the Euclidean-distance scalar to produce a combined similarity vector;

classifying the combined similarity vector to output a match probability between the palmprint image of the second hand of the unidentified user corresponding to the stable first hand anchor embedding associated with the first hand of the authorized user; and determining that the unidentified user is the authorized user when the match probability is above a threshold probability wherein the feature-extraction backbone comprises a visual geometry group palmprint-tuned convolutional neural network and the distinct final-layer weights are confined to a final dense layer of each of a first hand branch and a second hand branch of the semi-Siamese neural network.

2. The method for performing cross-hand palmprint recognition as recited in claim 1, wherein the number of the plurality of palmprint images of the first hand used to form the anchor embedding comprises between two and five of the plurality of palmprint images of the first hand.

3. The method for performing cross-hand palmprint recognition as recited in claim 1, wherein the number of the plurality of palmprint images of the first hand used to form the anchor embedding comprises four of the plurality of palmprint images of the first hand.

4. The method for performing cross-hand palmprint recognition as recited in claim 1, further comprising normalization of the element-wise absolute-difference vector and the Euclidean-distance scalar prior to the concatenation thereof.

5. The method for performing cross-hand palmprint recognition as recited in claim 1, further comprising scaling of the element-wise absolute-difference vector and the Euclidean-distance scalar prior to the concatenation thereof.

6. A method for performing cross-hand palmprint recognition, comprising:

storing a plurality of palmprint images of a first hand of an authorized user in a non-transitory computer readable memory;

obtaining a palmprint image of a second hand of an unidentified user and storing the palmprint of the second hand in the non-transitory computer readable memory;

performing feature extraction on each of the plurality of palmprint images of the first hand and the palmprint image of the second hand using a semi-Siamese neural network having a shared feature-extraction backbone and distinct final-layer weights for the plurality of palmprint images of the first hand and the palmprint image of the second hand;

extracting a fixed length feature vector from each of the plurality of palmprint images of the first hand and the palmprint image of the second hand;

forming an anchor embedding through feature aggregation by averaging the fixed length feature vectors extracted from the plurality of palmprint images of the first hand to obtain a stable first hand anchor embedding;

computing a hybrid similarity between the stable first hand anchor embedding and the one of the feature vectors corresponding to the palmprint image of the second hand, wherein the hybrid similarity comprises an element-wise absolute-difference vector and a Euclidean-distance scalar;

concatenating the element-wise absolute-difference vector and the Euclidean-distance scalar to produce a combined similarity vector;

classifying the combined similarity vector to output a binary decision indicating whether the palmprint image of the second hand of the unidentified user corresponds to the stable first hand anchor embedding associated with the first hand of the authorized user; and determining if the unidentified user is the authorized user based on the binary decision;

wherein the feature-extraction backbone comprises a visual geometry group palmprint-tuned convolutional neural network and the distinct final-layer weights are confined to a final dense layer of each of a first hand branch and a second hand branch of the semi-Siamese neural network.

7. The method for performing cross-hand palmprint recognition as recited in claim 6, wherein the binary decision is based on a decision threshold selected to satisfy a target false-acceptance rate and/or a false-rejection rate.

8. The method for performing cross-hand palmprint recognition as recited in claim 6, wherein the binary decision is based on a decision threshold selected to minimize an equal error rate.

9. The method for performing cross-hand palmprint recognition as recited in claim 6, wherein the number of the plurality of palmprint images of the first hand used to form the anchor embedding comprises between two and five of the plurality of palmprint images of the first hand.

10. The method for performing cross-hand palmprint recognition as recited in claim 6, wherein the number of the plurality of palmprint images of the first hand used to form the anchor embedding comprises four of the plurality of palmprint images of the first hand.

11. The method for performing cross-hand palmprint recognition as recited in claim 6, further comprising normalization of the element-wise absolute-difference vector and the Euclidean-distance scalar prior to the concatenation thereof.

12. The method for performing cross-hand palmprint recognition as recited in claim 6, further comprising scaling of the element-wise absolute-difference vector and the Euclidean-distance scalar prior to the concatenation thereof.

* * * * *